J. SLEPICKA.
ANIMAL TRAP.
APPLICATION FILED APR. 22, 1918.

1,284,801.

Patented Nov. 12, 1918.

WITNESSES
R. N. Jones
Irving S. McCathran

INVENTOR
Joseph Slepicka
BY Richard B. Owen
ATTORNEY

UNITED STATES PATENT OFFICE.

JOSEPH SLEPICKA, OF TOBIAS, NEBRASKA.

ANIMAL-TRAP.

1,284,801.

Specification of Letters Patent.

Patented Nov. 12, 1918.

Application filed April 22, 1918. Serial No. 230,129.

*To all whom it may concern:*

Be it known that I, JOSEPH SLEPICKA, a citizen of the United States, residing at Tobias, in the county of Saline and State of Nebraska, have invented certain new and useful Improvements in Animal-Traps, of which the following is a specification.

This invention relates to animal traps and has for its object the production of a simple and efficient animal trap which is especially designed for the purpose of catching squirrels and gophers, and the like.

Another object of this invention is the production of a simple and efficient trap which is formed from a plurality of sheet metal bands or strips which may be cheaply and conveniently assembled for the purpose of producing a very efficient and quickly operating trap.

With these and other objects in view this invention consists of certain novel constructions, combinations and arrangements of parts as will be hereinafter fully described and claimed.

Figure 1:
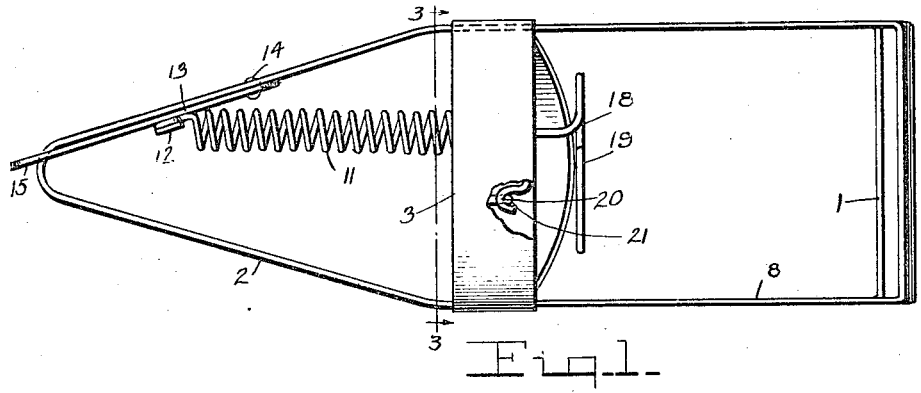
Figure 1 is a top plan view of the trap.
Figure 3:
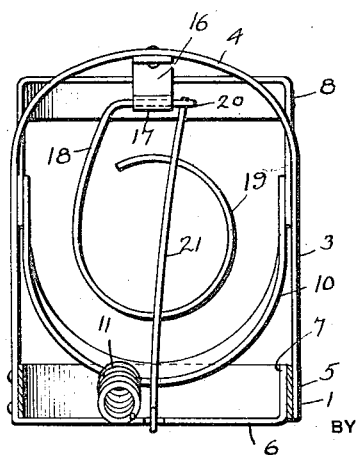
Fig. 3 is a section taken on line 3—3 of Fig. 1, looking in the direction of the arrow.

By referring to the drawings, it will be seen that 1 designates the base of the trap which is preferably formed of a rectangular construction, the base being formed of a sheet of metal constituting a band, the rear end thereof tapering as indicated in Fig. 1 by the numeral 2. A jaw supporting frame 3 is connected to the base 1 and comprises a substantially rectangular frame having an upwardly curved end 4 as shown in Fig. 3. The frame 3 is preferably formed from a single strip of material and is secured at its lower end 5 to the base 1 and extends upwardly for the purpose of constituting a substantially rectangular frame, the opposite ends of the bands extending under the base 1 as indicated at 6 and being provided with an upwardly extending foot 7, the foot 7 being secured to the inner face of the base 1 as shown in Fig. 3. It of course should be understood that the frame 3 may be secured to the base by any suitable or desired means such as rivets and the like.

Figure 2:
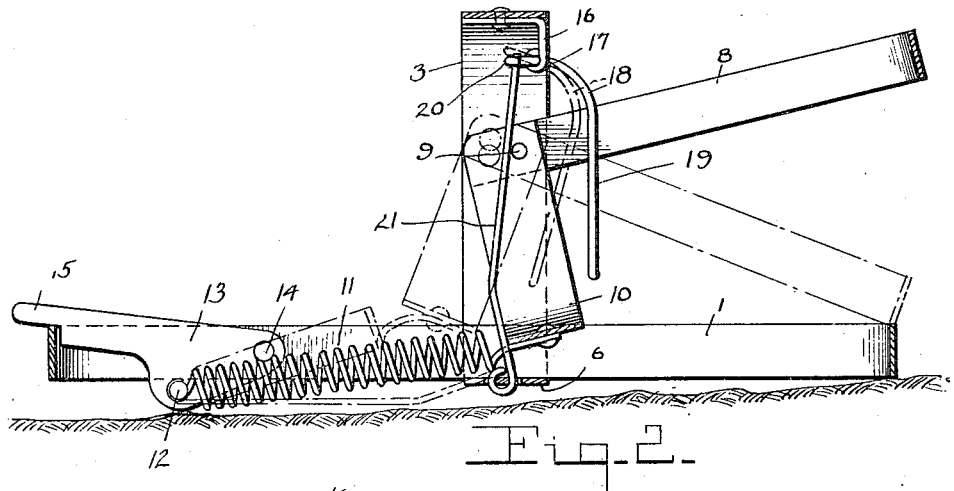
Fig. 2 is a longitudinal section thereof.

A jaw 8 is pivotally mounted upon the frame 3 by means of a pivot pin 9 upon each side thereof and this jaw is substantially U-shaped. The inner ends of jaw 8 are secured by means of a substantially semi-circular connecting band 10 as shown in Figs. 2 and 3 of the drawings, the bands 10 being curved downwardly and being connected to the coil spring 11. This coil spring 11 is secured at its inner end to the band 10, and the outer end of the coil spring 11 is secured to a pivot pin 12 carried by the operating or releasing lever 13. This lever 13 is pivotally mounted upon a pivot pin 14 upon the base 1 and the lever is adapted to be swung downwardly upon the base 1 so as to have the finger 15 thereof overhang the rear end of the base as shown in Figs. 1 and 2 of the drawings. When the lever 13 is in this position, the spring 11 will be in a proper position for holding the jaw 8 in a folded position or normally urging the same to a closed position. When it is desired to place the base upon the trap, the lever 13 may be swung to a vertical position, thereby relieving the tension from the spring 11 and preventing the jaw 8 from accidentally swinging to a closed position which would be likely to cause an injury to the hand of the operator while he is filling the trap with bait.

A hanger bracket 16 is supported upon the frame 3 and this hanger bracket 16 is provided with a supporting eye 17 at the lower end thereof, within which supporting eye 17 is pivotally mounted the bait supporting wire 18. This bait supporting wire 18 is provided with a bait supporting loop 19 which is coiled therefrom and the wire 18 is also provided with a rearwardly extending trigger engaging loop or hook 20. A trigger link 21 is connected to the transversely extending end 6 of the frame 3 as shown in Figs. 2 and 3 of the drawings, and this trigger link 21 is adapted to engage or fit behind the hook 20 for the purpose of holding the jaw 8 in an open position. The link trigger 21 extends in back of the semi-circular band 10 carried by the jaw 8 and will firmly hold the jaw 8 in an open position. As soon as an animal enters the trap between the base 1 and the jaw 8 for the purpose of keeping the bait carried by the loop 19, the slight pressure upon the loop 19 will cause the hook 20 to be released from the trigger link 21, the spring 11 then forcing the jaw 8 to a closed position and firmly holding the animal between the outer end of the jaw 8 and the outer end of the base 1.

The link 21 will then swing downwardly to the position shown in dotted lines in Fig. 2 and the animal will then be firmly held in engagement with the trap until released by the person who has set the trap.

From the foregoing description, it will be seen that a very simple and efficient animal trap has been produced which may be formed of a very minimum number of parts and which parts may be very quickly and readily assembled. It of course should be understood that certain obvious detail mechanical changes may be made in the present device without departing from the spirit of the invention, so long as these changes fall within the scope of the appended claims.

It of course should be understood that any suitable or desired anchoring means may be employed for securing the frame 1 in a set position and preventing the frame from being carried from place to place by the animal after the same is caught within the trap. A suitable chain may be employed for this purpose.

What is claimed is:

1. An animal trap of the class described comprising a base, a jaw pivotally supported upon said base, a spring connected to said jaw for normally urging the same to a closed position, a trigger engaging said jaw for holding the jaw in an open position, and a tension controlling lever carried by said base and engaging said spring for permitting tension to be released and applied to said spring.

2. An animal trap of the class described comprising a base, a frame carried thereby, a jaw pivotally mounted upon said frame, a spring connected to said jaw for swinging the same to a closed position after the same is released, a tension controlling lever pivotally mounted upon said frame, and means for connecting said frame to one side of the pivot point of said lever whereby the tension of said spring will be controlled as said lever is swung upon said frame.

3. An animal trap of the class described comprising a base, a frame carried thereby, a jaw pivotally mounted upon said frame, trigger means for holding said jaw in an open position, a tension means connected to said jaw and adapted to swing the same to a closed position when said trigger means is released, a tension controlling lever pivotally mounted upon said frame, means for connecting said tension means to one side of the pivot point of said lever whereby the tension of said spring will be controlled as said lever is swung upon said frame, and said lever provided with a projecting finger overhanging the rear portion of said frame for limiting the downward swinging movement of said lever upon said frame.

In testimony whereof I affix my signature in presence of two witnesses.

JOSEPH SLEPICKA.

Witnesses:
F. H. ALLEN,
A. H. GRAYSON.

Copies of this patent may be obtained for five cents each, by addressing the "Commissioner of Patents, Washington, D. C."